(12) United States Patent
Yang et al.

(10) Patent No.: US 9,716,780 B2
(45) Date of Patent: Jul. 25, 2017

(54) TELEPHONE DEVICE

(71) Applicant: PEGATRON CORPORATION, Taipei (TW)

(72) Inventors: Fen-Ming Yang, Taipei (TW); Chun-Cheng Chang, Taipei (TW); Wei-Chun Hung, Taipei (TW)

(73) Assignee: Pegatron Corporation, Taipei (TW)

( * ) Notice: Subject to any disclaimer, the term of this patent is extended or adjusted under 35 U.S.C. 154(b) by 0 days.

(21) Appl. No.: 15/238,195

(22) Filed: Aug. 16, 2016

(65) Prior Publication Data
US 2017/0134544 A1 May 11, 2017

(30) Foreign Application Priority Data

Nov. 10, 2015 (TW) .............................. 104136992 A

(51) Int. Cl.
*H04M 1/00* (2006.01)
*H04M 1/02* (2006.01)

(52) U.S. Cl.
CPC ........ *H04M 1/026* (2013.01); *H04M 2201/08* (2013.01); *H04M 2250/12* (2013.01)

(58) Field of Classification Search
CPC ............. H04M 1/026; H04M 2201/08; H04M 2250/12
USPC ..................................................... 455/575.1
See application file for complete search history.

(56) References Cited

U.S. PATENT DOCUMENTS

| 2,322,851 | A | * | 6/1943 | Kalb | .................. | H01H 36/0046 |
| | | | | | | 379/424 |
| 3,413,423 | A | * | 11/1968 | Stevko | .................... | H04M 1/02 |
| | | | | | | 379/424 |
| 6,289,100 | B1 | * | 9/2001 | Ritter | ...................... | H04M 1/10 |
| | | | | | | 379/424 |
| 7,248,713 | B2 | * | 7/2007 | Bren | ...................... | H04R 25/50 |
| | | | | | | 381/312 |
| 8,233,646 | B2 | * | 7/2012 | Lutz | ......................... | H04R 7/18 |
| | | | | | | 381/150 |

FOREIGN PATENT DOCUMENTS

| CN | 1373593 A | 10/2002 |
| CN | 201590891 U | 9/2010 |
| JP | H01264444 | 10/1989 |
| JP | 2006-081017 | 3/2006 |

* cited by examiner

*Primary Examiner* — April G Gonzales
(74) *Attorney, Agent, or Firm* — Muncy, Geissler, Olds & Lowe, P.C.

(57) ABSTRACT

A telephone device is disclosed. The telephone device has a base, a magnetic field generating device, an ear set, a magnetic sensor and a controller. The base has an ear set accommodating area. The magnetic field generating device situates with the base and generates a magnetic field. The ear set detachably connects with the base. The ear set has a magnetic conducted element. The magnetic sensor situates with the base for detecting the magnetic field. The magnetic field detected by the magnetic sensor is reduced due to interference of the magnetic conducted element when the ear set situates at the ear set accommodating area. The controller electronically connects with the magnetic sensor and determines whether the eat set is situated in the ear set accommodating area based on the change of the magnetic field detected by the magnetic sensor.

16 Claims, 4 Drawing Sheets

TELEPHONE DEVICE

CROSS-REFERENCE TO RELATED APPLICATIONS

This non-provisional application claims priority of Application No. 104136992 filed in Taiwan on Nov. 10, 2015 under 35 U.S.C. §119, the entire contents of which are hereby incorporated by reference.

BACKGROUND OF THE INVENTION

1. Field of the Invention

The present invention relates to a telephone device, particularly to a telephone device which detects whether the telephone is hung up based on the change of magnetic field.

2. Description of the Related Art

Currently, the common telephone device mostly uses a mechanical switch to determine whether the telephone device is in a hang up state. However, the mechanical switch requires a certain operating space to ensure the operation accuracy of the telephone device. Due to the deployment of the mechanical switch, the thickness of the telephone device could not be thinned. In addition to the mechanical switch, at present, an optical device is also used to determine whether the telephone device is in a hang up state. If the device used for detecting light deviates from the designed light path, or the emission angle is no precisely controlled, the optical device may misjudge the use state of the telephone device, causing inconvenience to users. Therefore, it is necessary to make improvements.

SUMMARY OF THE INVENTION

It is a major objective of the present invention to provide a telephone device which detects whether a telephone is hung up based on the change of magnetic field.

To achieve the above objective, the telephone device in the present invention includes a base, an ear set, a magnetic field generating device, a magnetic sensor, and a controller. The base includes an ear set accommodating area. The magnetic field generating device is situated within the base. The ear set is detachably connected with the ear set accommodating area. The ear set includes a magnetic conducted element. The magnetic field generating device is used for generating a magnetic field. The magnetic sensor is situated within the base for detecting magnetic field. When the ear set is accommodated in ear set accommodating area, the magnetic field detected by the magnetic sensor is reduced due to the interference of the magnetic conducted element. The controller is electrically connected with the magnetic sensor, and determines whether the ear set is accommodated in the ear set accommodating area based on the change of the magnetic field detected by the magnetic sensor.

By detecting changes in magnetic field measured by a magnetic sensor, the present invention can determine the current phone use without reserving space required for the operation of a mechanical switch, so that the thickness of the telephone device in the present invention can be reduced. This also avoids the uncertainty occurred when using the optical element of the previously mentioned technology to replace mechanical switches. In addition, the magnetic field generating device in the present invention is situated in the base rather than in the ear set. This not only avoids the happening of circumstances in which user calls are interfered by the magnetic field generating device, but also prevents a user from being stabbed by an object (e.g. paperclip) attracted by the magnetic field generating device.

DETAILED DESCRIPTION OF THE PREFERRED EMBODIMENT

Hereafter, the technical content of the present invention will be better understood with reference to preferred embodiments. Please refer to FIGS. 1 to 4, which are a schematic drawing of a telephone device in an embodiment of the present invention, a partial exploded view of a base in an embodiment, a schematic drawing showing the telephone device in a use state according to an embodiment, and a schematic drawing showing the telephone device in a hang up state according to an embodiment.

Figure 1:
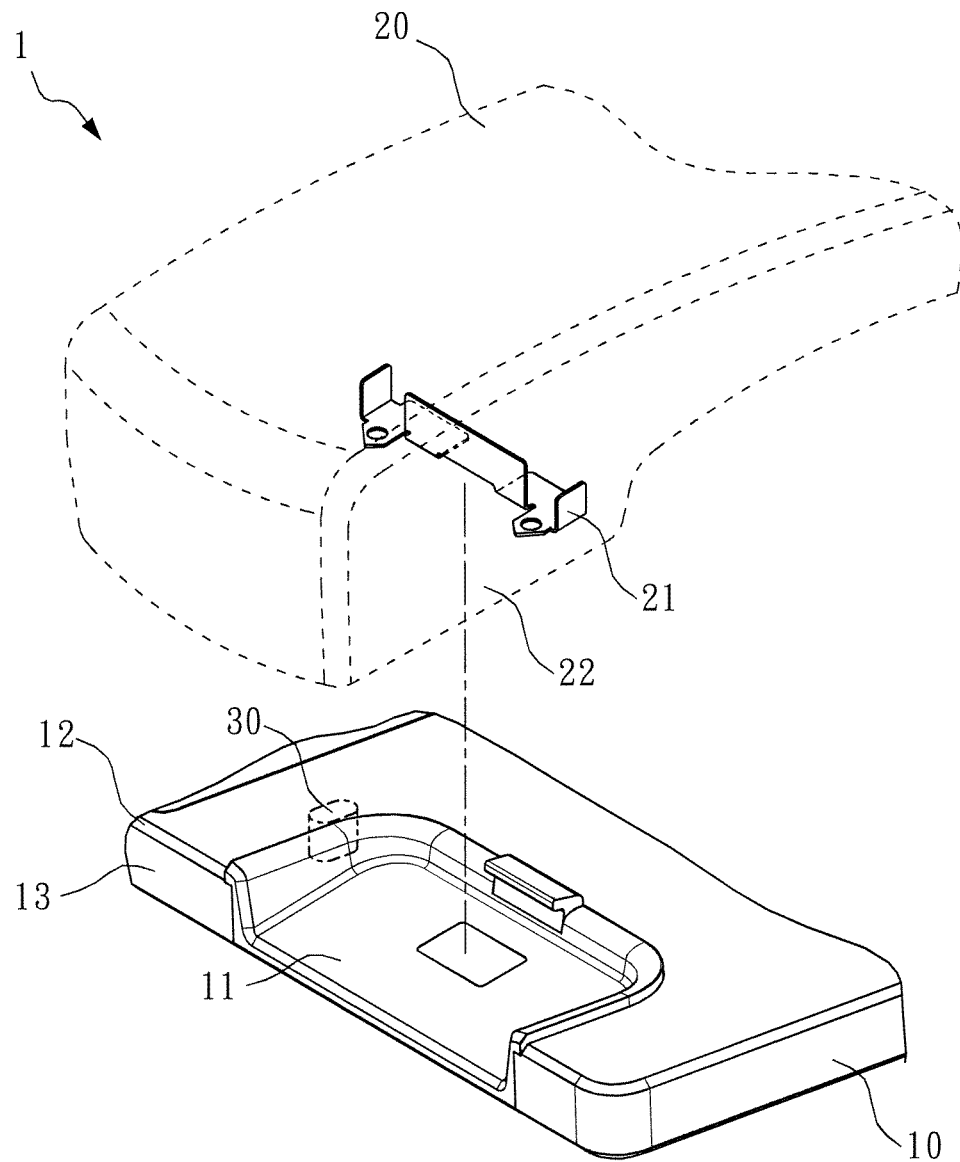
FIG. 1 is a schematic drawing of a telephone device in an embodiment of the present invention.
Figure 2:
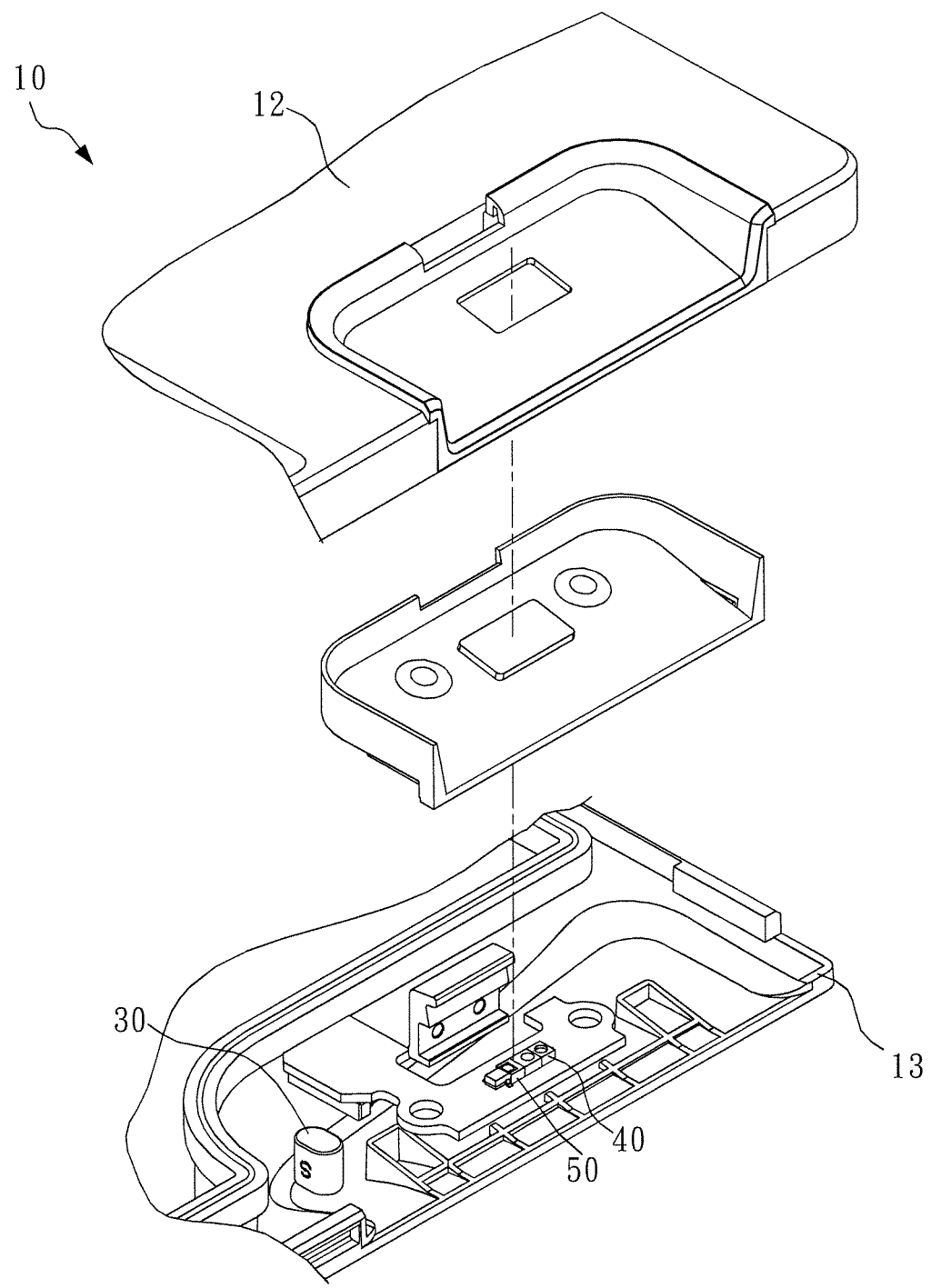
FIG. 2 is a partial exploded view of a base of the present invention in an embodiment of the present invention.

As shown in FIGS. 1 and 2, a telephone device 1 of the present invention includes a base 10, an ear set 20, a magnetic field generating device 30, a controller 40 and a magnetic sensor 50. The telephone device 1 in the present invention may be a traditional desktop phone or Internet phone. The base 10 includes an ear set accommodating area 11, a base cover 12, and a bottom base case 13. The ear set accommodating area 11 is situated in the base cover 12. In the present embodiment, the magnetic field generating device 30, the controller 40, and the magnetic sensor 50 are all within the space formed by the accommodated in base cover 12 and the bottom base case 13. The ear set 20 and the base 10 are detachably connected with the ear set accommodating area 11. When the ear set 20 is situated in the ear set accommodating area 11, the telephone device 1 is in a state able to receive outside calls. When the ear set 20 detaches from the base 10, the telephone device 1 is in a busy state.

Figure 3:
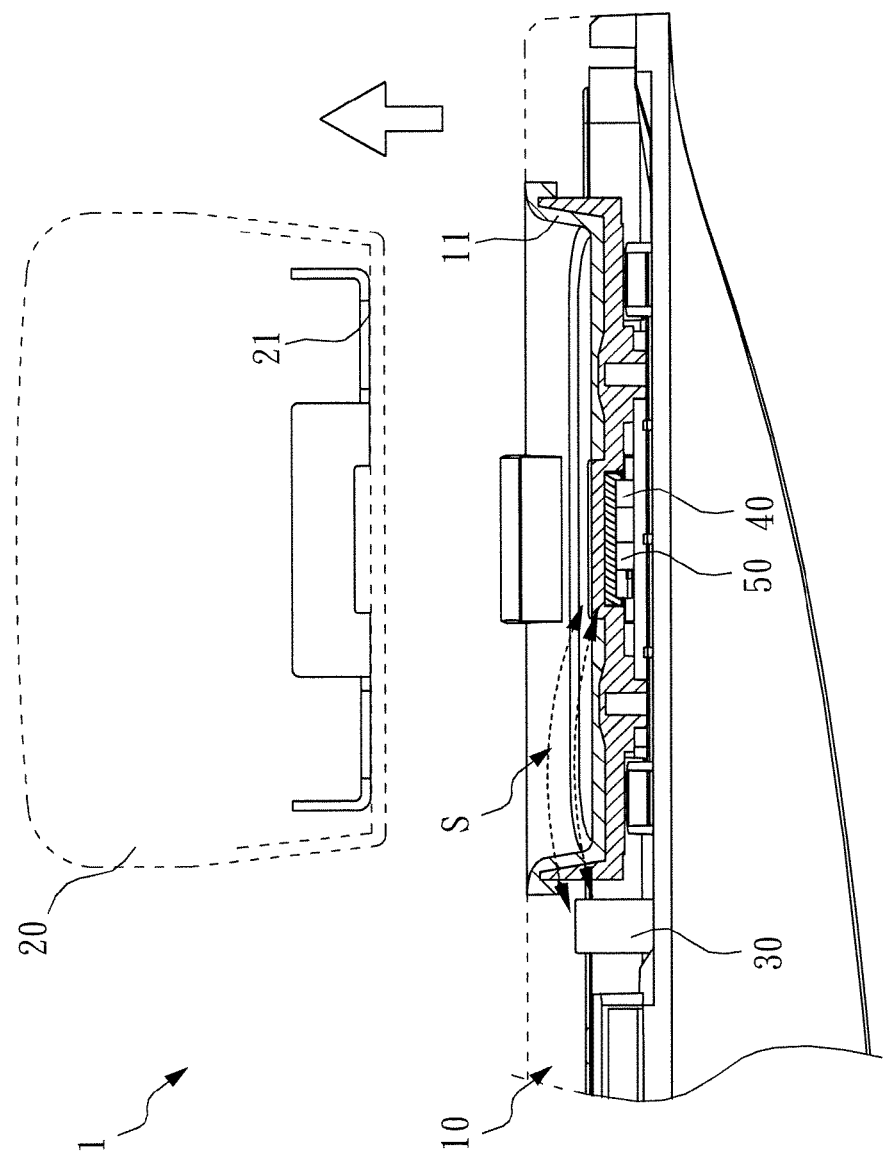
FIG. 3 is a schematic drawing showing the telephone device is in a use state according to an embodiment of the present invention.

As shown in FIGS. 1 and 3, the ear set 20 includes a magnetic conducted element 21 and an answer end 22. The magnetic conducted element 21 is situated at the answer end 22. According to an embodiment of the present invention, the magnetic conducted element 21 may be a silicon steel or SGCC steel. The magnetic field generating device 30 is used for generating a magnetic field S. In the present embodiment, the magnetic field generating device 30 is a magnet, but the present invention is not limited thereto. Also, the magnetic field generating device 30 may be an electromagnet or other device capable of generating a magnetic field. It should be noted here that the magnetic field may be an S or N pole based magnetic field. Additionally, the magnetic field generating device 30 may be situated at the base cover 12 or at the bottom base case 13. However, according to an embodiment of the present invention, no matter the magnetic field generating device 30 is situated at the base cover 12 or the bottom base case 13 below the ear set accommodating area 11, the magnetic field generating device 30 is situated adjacent to the magnetic sensor 50. That is, the magnetic field generating device 30 may be immediately adjacent to the magnetic sensor 50 or a predetermined distance away from the magnetic sensor 50 depending on the type of the magnetic field generating device 30 or the magnetic sensor 50. The predetermined distance referred to herein may be a range that the magnetic sensor 50 could actually detect the magnetic field S. However, the magnetic sensor 50 with a different specification may have a different detection range. Thus, there is no specific range of the predetermined distance referred to in the present invention. The range of the predetermined distance could be specified by those skilled in the art in accordance with different specifications of the magnetic sensor 50.

Figure 4:
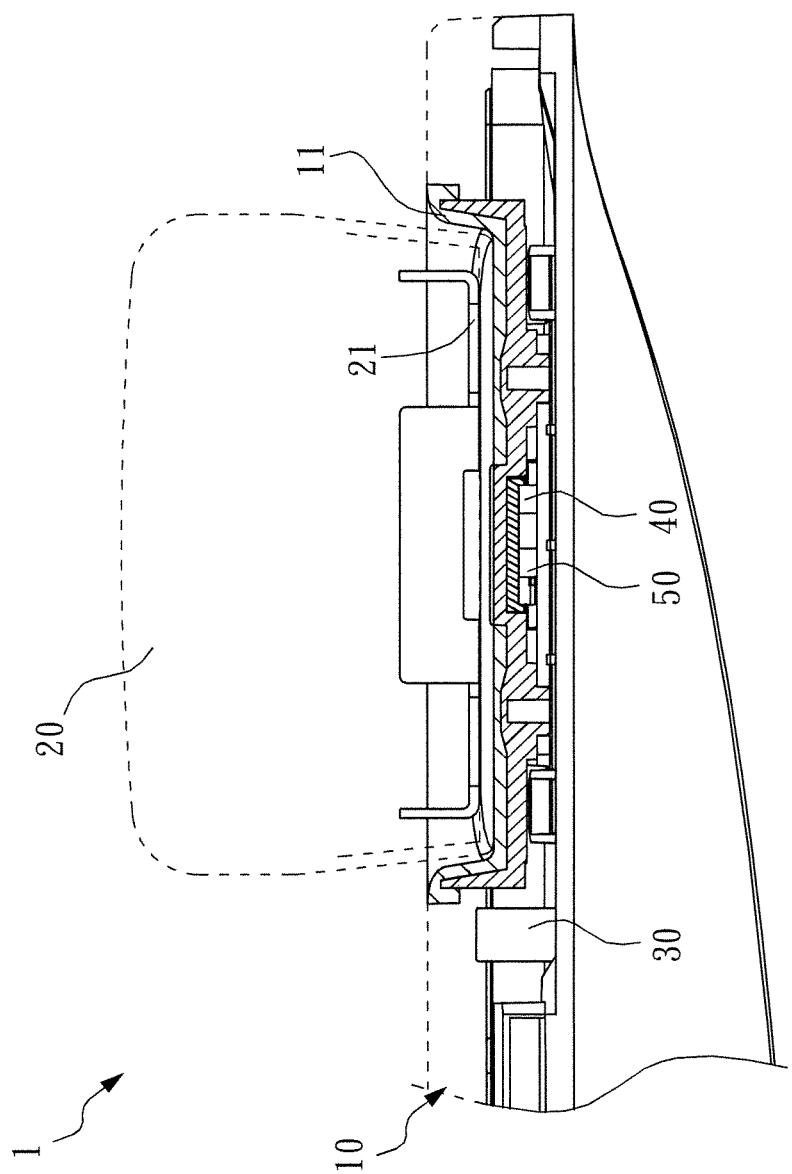
FIG. 4 is a schematic drawing showing the telephone device is in a hang up state according to an embodiment of the present invention.

As shown in FIGS. 2 to 4, the magnetic sensor 50 is situated below the ear set accommodating area 11, and used for detecting the change of the magnetic field S generated by the magnetic field generating device 30. The magnetic sensor 50 in the present embodiment is a Hall sensor. As shown in FIG. 3, when the ear set 20 detaches from the base 10, the magnetic field S generated by the magnetic field generating device 30 is not interfered by the magnetic conducted element 21. Thus, the magnetic field S can be detected by the magnetic sensor 50. As shown in FIG. 4, when the ear set 20 is situated in the ear set accommodating area 11, the magnetic conducted element 21 guides the magnetic field S generated by the magnetic field generating device 30 to block the magnetic field S detected by the magnetic sensor 50, resulting in lower strength magnetic field S. In other embodiments, the magnetic conducted element 21 can also completely block the magnetic field S, such that the magnetic sensor 50 is unable to detect the magnetic field S.

It should be noted here that the magnetic sensor 50 may be situated at the base cover 12 or the bottom base case 13. However, according to the current operating characteristics of the magnetic sensor 50, in a preferred embodiment of the present invention, both the magnetic sensor 50 and the magnetic field generating device 30 are situated at the base cover 12 below the ear set accommodating area 11, such that the magnetic sensor 50 surely detects the magnetic field S, but the present invention is not limited to the embodiment described above. Alternatively, the magnetic sensor 50 and the magnetic field generating device 30 may be situated at the base cover 12 under the ear set accommodating area 11 and at the bottom base case 13 respectively. That is, when the magnetic sensor 50 is situated on the bottom base case 13, the magnetic field generating device 30 is situated on the base cover 12; when the magnetic sensor 50 is situated on the base cover 12, the magnetic field generating device 30 is situated at the bottom base case 13.

As shown in FIGS. 2 to 4, the controller 40 is electrically connected with the magnetic sensor 50. The controller 40 determines whether the ear set 20 is accommodated in the ear set accommodating area 11 based on the strength of the magnetic field S detected by the magnetic sensor 50. As shown in FIG. 3, when the ear set 20 detaches from the base 10, the magnetic field S generated by the magnetic field generating device 30 is not interfered by the magnetic conducted element 21. Thus, the magnetic field S can be detected by the magnetic sensor 50. At this time, the controller 40 detects that the telephone device 1 is in a busy state. As shown in FIG. 4, when the ear set 20 is situated in the ear set accommodating area 11, the magnetic conducted element 21 blocks the magnetic field S generated by the magnetic field generating device 30, and the magnetic sensor 50 in unable to detect the magnetic field S or only detects the lower strength magnetic field S. At this time, the controller 40 detects that the telephone device 1 is in a state able to receive outside calls. According to an embodiment of the present invention, the controller 40 may be a microcontroller or software program.

According to the present invention, the controller 40 is used to detect whether the magnetic field strength measured by the magnetic sensor 50 is weakened to determine whether the telephone device 1 is in a call or hang up state. In the overall structure, there is no need to reserve space in the telephone device 1 for accommodating a traditional mechanical switch. Thus, the thickness of the telephone device 1 in the present invention could be thinner. This avoids the uncertainty of using an optical element mentioned in the art to replace a mechanical switch. In addition, the magnetic field generating device 30 in the present invention is situated in the base 10 rather than in the ear set 20. This not only avoids the happening of circumstances in which user calls are interfered by the magnetic field generating device 30, but also prevents a user from being stabbed by an object (e.g. paperclip) attracted by the magnetic field generating device 30.

It should be noted that the described embodiments are not necessarily exclusive, and various changes and modifications may be made to the described embodiments without departing from the scope of the invention as situated by the appended claims.

What is claimed is:

1. A telephone device, comprising:
   a base, comprising an ear set accommodating area;
   a magnetic field generating device, situated in the base, and used for generating a magnetic field;
   an ear set, detachably accommodated in the ear set accommodating area, and comprising a magnetic conducted element;
   a magnetic sensor, situated within the base for detecting the magnetic field, the magnetic field detected by the magnetic sensor being reduced due to interference of the magnetic conducted element when the ear set being accommodated in the ear set accommodating area; and
   a controller, electrically connected with the magnetic sensor, and determining whether the ear set is accommodated in the ear set accommodating area based on a change of the magnetic field detected by the magnetic sensor.

2. The telephone device as claimed in claim 1, wherein the magnetic conducted element blocks the magnetic field when the ear set is accommodated in the ear set accommodating area, such that the magnetic sensor is unable to detect the magnetic field.

3. The telephone device as claimed in claim 2, wherein in the case that the magnetic field detected by the magnetic sensor is reduced or unable to be detected, the controller determines that the ear set is accommodated in the ear set accommodating area.

4. The telephone device as claimed in claim 2, wherein the ear set comprises an answer end, the magnetic conducted element is situated at the answer end, and the magnetic conducted element corresponds in position to the magnetic sensor when the ear set is accommodated in the ear set accommodating area.

5. The telephone device as claimed in claim 4, wherein the base comprises a base cover where the ear set accommodating area is situated, and the magnetic sensor and the magnetic field generating device are both situated at one side of the base cover, which is opposite to the ear set accommodating area.

6. The telephone device as claimed in claim 4, wherein the base comprises a base cover and a bottom base case, the ear set accommodating area is situated at the base cover, and both the magnetic sensor and the magnetic field generating device are situated at the bottom base case below the ear set accommodating area.

7. The telephone device as claimed in claim 4, wherein the base comprises a base cover and a bottom base case, the ear set accommodating area is situated at the base cover, and the magnetic field generating device is situated at the base cover or the bottom base case.

8. The telephone device as claimed in claim 2, wherein the magnetic field generating device is a magnet or an electromagnet, the magnetic sensor is a Hall sensor, and the magnetic conducted element is a silicon steel or SGCC steel.

9. The telephone device as claimed in claim 1, wherein in the case that the ear set detaches from the base, the magnetic field detected by the magnetic sensor is not reduced without being interfered by the magnetic conducted element.

10. The telephone device as claimed in claim 9, wherein in the case that the magnetic field detected by the magnetic sensor is not reduced without being interfered by the magnetic conducted element, the controller determines that the ear set is not accommodated in the ear set accommodating area.

11. The telephone device as claimed in claim 1, wherein the magnetic field generating device is situated adjacent to the magnetic sensor.

12. The telephone device as claimed in claim 1, wherein the ear set comprises an answer end, the magnetic conducted element is situated at the answer end, and the magnetic conducted element corresponds in position to the magnetic sensor when the ear set is accommodated in the ear set accommodating area.

13. The telephone device as claimed in claim 12, wherein the base comprises a base cover where the ear set accommodating area is situated, and the magnetic sensor and the magnetic field generating device are both situated at one side of the base cover, which is opposite to the ear set accommodating area.

14. The telephone device as claimed in claim 12, wherein the base comprises a base cover and a bottom base case, the ear set accommodating area is situated at the base cover, and both the magnetic sensor and the magnetic field generating device are situated at the bottom base case below the ear set accommodating area.

15. The telephone device as claimed in claim 12, wherein the base comprises a base cover and a bottom base case, the ear set accommodating area is situated at the base cover, and the magnetic field generating device is situated at the base cover or the bottom base case.

16. The telephone device as claimed in claim 1, wherein the magnetic field generating device is a magnet or an electromagnet, the magnetic sensor is a Hall sensor, and the magnetic conducted element is a silicon steel or SGCC steel.

* * * * *